US011467468B2

(12) United States Patent
Vuckovic et al.

(10) Patent No.: US 11,467,468 B2
(45) Date of Patent: Oct. 11, 2022

(54) DISPERSION ENGINEERED PHASED ARRAY

(71) Applicant: The Board of Trustees of the Leland Stanford Junior University, Stanford, CA (US)

(72) Inventors: Jelena Vuckovic, Palo Alto, CA (US); Dries J. F. Vercruysse, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 75 days.

(21) Appl. No.: 16/885,833

(22) Filed: May 28, 2020

(65) Prior Publication Data
US 2020/0379315 A1    Dec. 3, 2020

Related U.S. Application Data

(60) Provisional application No. 62/853,526, filed on May 28, 2019.

(51) Int. Cl.
*G02F 1/29* (2006.01)
*G02F 1/295* (2006.01)
*G02B 6/122* (2006.01)
*G02B 6/14* (2006.01)

(52) U.S. Cl.
CPC ......... *G02F 1/2955* (2013.01); *G02B 6/1225* (2013.01); *G02B 6/14* (2013.01)

(58) Field of Classification Search
CPC ........ G02F 1/2955; G02B 6/1225; G02B 6/14
USPC .................................... 385/4, 14, 15, 28, 31
See application file for complete search history.

(56) References Cited

U.S. PATENT DOCUMENTS

| | | | | |
|---|---|---|---|---|
| 8,081,117 B2 * | 12/2011 | Nagai | ................. | H01Q 15/006 343/893 |
| 8,200,055 B2 * | 6/2012 | Subbaraman | ......... | G02F 1/2955 385/125 |
| 8,988,754 B2 * | 3/2015 | Sun | .................... | G02B 6/12033 359/238 |
| 10,613,410 B2 * | 4/2020 | Hosseini | ................. | G02F 1/292 |
| 10,816,696 B2 * | 10/2020 | Jin | ........................ | G02F 1/0147 |

(Continued)

OTHER PUBLICATIONS

"Review on the Optimization Methods of Slow Light in Photonic Crystal Waveguide" by Zhao et al, IEEE Transactions on Nanotechnology, vol. 14, No. 3, pp. 407-426 (Year: 2015).*

(Continued)

*Primary Examiner* — Robert Tavlykaev
(74) *Attorney, Agent, or Firm* — Lumen Patent Firm

(57) ABSTRACT

A photonic crystal optical phased array device has a dispersion engineered slow light waveguide region; a mode coupler region capable of optically coupling an input waveguide to the dispersion engineered slow light waveguide region; and optical antenna regions integrated within the dispersion engineered slow light waveguide region. The dispersion engineered slow light waveguide region has a substantially linear dispersion relation within a predetermined operational bandwidth of the optical phased array device. The optical antenna regions are formed by an alteration of a periodic structure of the photonic crystal and are capable of radiating light out from the dispersion engineered slow light waveguide region.

10 Claims, 17 Drawing Sheets

(56) References Cited

U.S. PATENT DOCUMENTS

2012/0301075 A1* 11/2012 Wang .................... B82Y 20/00
    385/28
2019/0204419 A1* 7/2019 Baba .................... G01S 7/4815

OTHER PUBLICATIONS

"Tapered Couplers for Efficient Interfacing Between Dielectric and Photonic Crystal Waveguides" by Mekis et al, Journal of Lightwave Technology, vol. 19, No. 6, pp. 861-865 (Year: 2001).*

"Si photonic crystal waveguide based delay lines" by Lin et al, Proc. SPIE 8564, Nanophotonics and Micro/Nano Optics, 85640P (Year: 2012).*

Takeuchi, et al. Thermally controlled Si photonic crystal slow light waveguide beam steering device. Optics Express, 26(9):11529, 2018.

Abe, et al. Two-dimensional beam-steering device using a doubly periodic Si photonic-crystal waveguide. Optics Express, 26(8):9389, 2018.

Molesky, et al. Outlook for inverse design in nanophotonics. Nature Photonics, (Nov. 12, 2018).

Piggott, et al'. Inverse design and demonstration of a compact and broadband on-chip wavelength demultiplexer. Nature Photonics, 9(6):374-377, 2015.

* cited by examiner

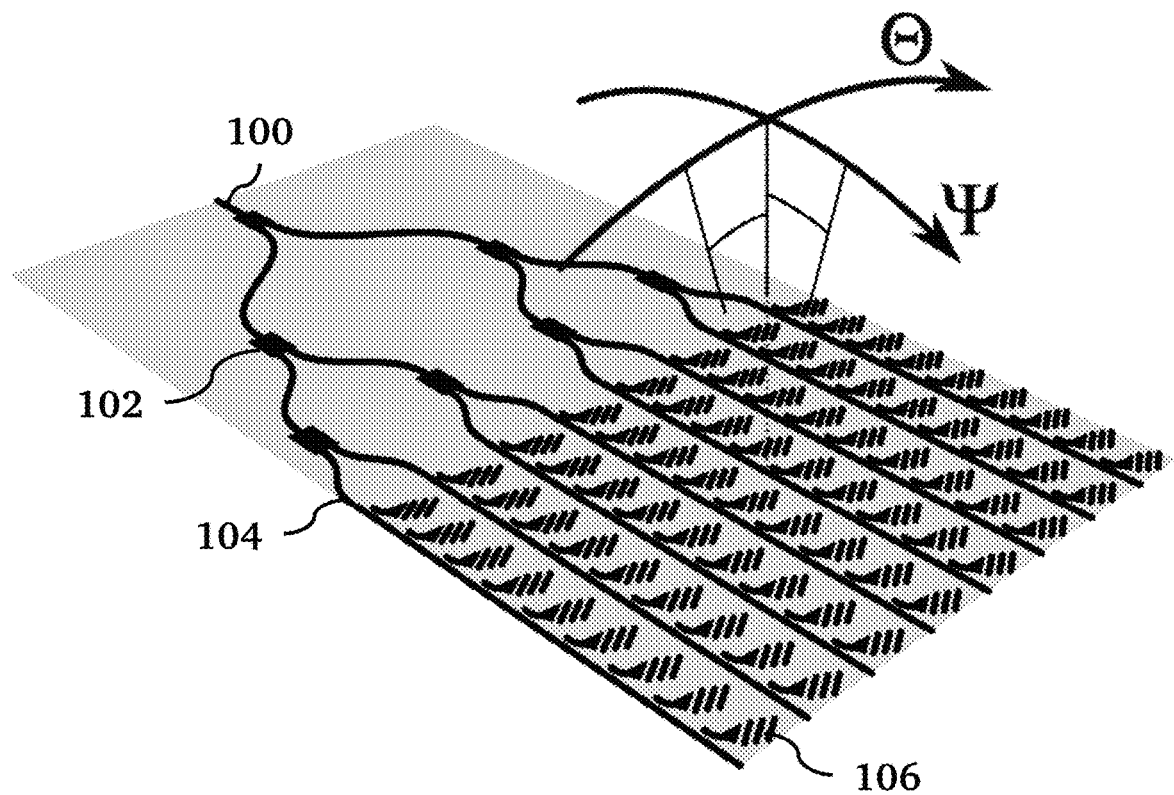
*Fig. 1A*
*Fig. 1B*
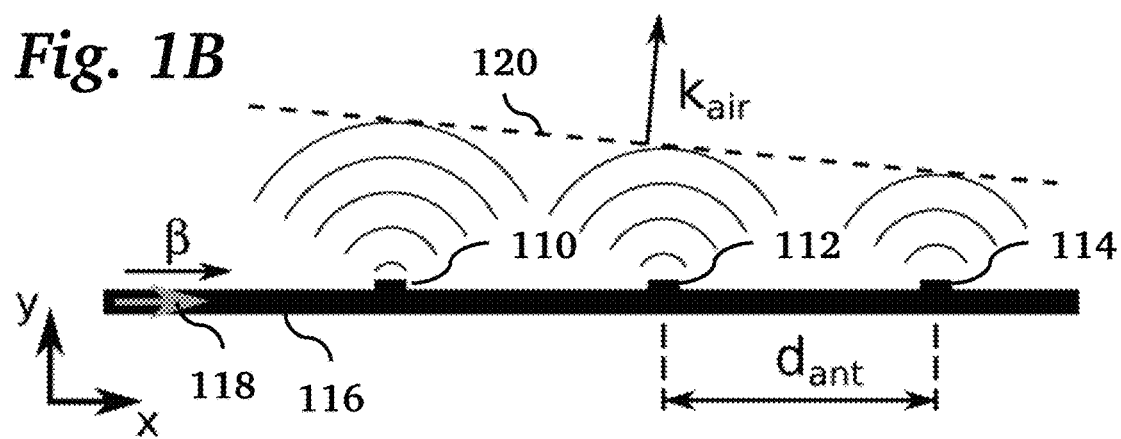

*Fig. 2C*
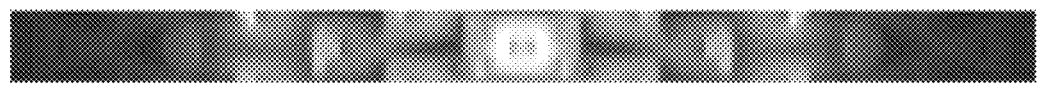
*Fig. 2D*
*Fig. 2E*
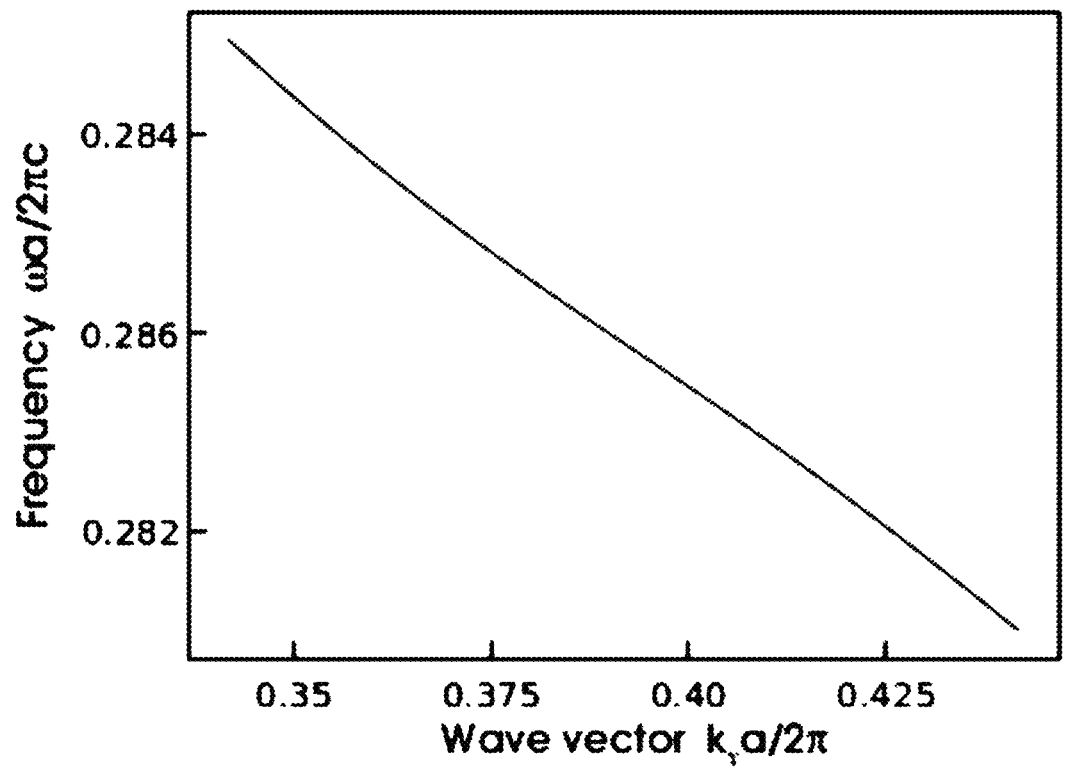

DISPERSION ENGINEERED PHASED ARRAY

CROSS-REFERENCE TO RELATED APPLICATIONS

This application claims priority from U.S. Provisional Patent Application 62/853,526 filed May 28, 2019, which is incorporated herein by reference.

STATEMENT REGARDING FEDERALLY SPONSORED RESEARCH OR DEVELOPMENT

None.

FIELD OF THE INVENTION

The present invention relates generally to optical phased arrays. More specifically, it relates to photonic crystal optical phased arrays.

BACKGROUND OF THE INVENTION

Optical beam steering techniques are important in projection systems, 3D printing, various sensing devices, and light detection and ranging (LiDAR). Applications of LiDAR include autonomous vehicles, aerial mapping, atmospheric measurements, and security systems. Currently, most optical beam steering devices use rotating lasers or mirrors to perform scanning. In addition to being bulky and expensive, these are also sensitive to vibrations and alignment error. The desire for low-cost, compact beam optical steering systems has motivated research of integrated devices based on microelectro-mechanical mirrors, acoustic-optic effects, or phase-change materials to accomplish steering. Yet, these devices typically lack in speed, scan-range or beam divergence.

Another approach to optical beam steering is to use an optical phased array (OPA). An OPA uses an array of antennas, each emitting light with a phase corresponding to that of the wavefront of the desired angled beam. By actively changing the phase relations between the antennas, the wavefront can be altered, allowing the beam to be steered. A major challenge in the design of an OPA is that the antennas should be spaced very close to each other, i.e., preferably less than 1 µm for optical wavelengths, because larger spacing results in side lobes in which energy is lost and which are typically detrimental for the intended application. This creates a challenge of fabricating on a very small scale the antennas, the optical waveguide that feeds the antennas, and the phase modulators that control the phases of light emitted from the antennas.

To allow a higher density of antenna elements in the array, a conventional 2D optical phased array does not use a separate phase modulator for each individual antenna, but instead uses a phase shifter for each of line of antennas. These phase shifters, however, only allow the array to be actively steered along one axis (in the transverse direction). Steering along the second axis (in the longitudinal direction) is performed by controlling the wavelength input to each line of antennas. By combining these techniques, a dense optical phased array can steer a beam in two directions.

Steering with wavelength, however, currently has limitations when using strip waveguides on the conventional silicon-on-insulator platform. To obtain a 14° range of steering angles would require a 100 nm bandwidth, which is beyond the capabilities of compact, low-cost integrated lasers. Moreover, a 14° degree range is still small considering that a LiDAR system for autonomous vehicles typically wants to address a 360×30 degree field of vision.

In summary, current OPAs fail to meet the specifications needed to be applicable in low-cost systems. The steering range of these OPAs is often too small or requires a wavelength tuning range beyond what is achievable with a compact integrated laser.

BRIEF SUMMARY OF THE INVENTION

In one aspect, the present technology provides an optical phased array based on dispersion engineered waveguides. By using dispersion engineered waveguides, the phased array can be more sensitive to the wavelength, that is, by changing the wavelength, the beam emitted from the optical phased array can be steered over a larger angle compared to phased arrays based on typical strip waveguides.

Realizing such a phased array involves overcoming challenges in designing dispersion engineered waveguides with near linear dispersion relation, designing a mode converter that couples light from the input waveguide mode to the dispersion engineered waveguide mode, designing antennas integrated in the waveguide to radiate out light from the waveguide, all while ensuring that the antenna and waveguide are spaced close to each other (e.g. 2 µm). These are all non-trivial optical design problems.

The dispersion engineered phased array can scan a large angle with a smaller wavelength range compared to phased arrays based on strip waveguides. The larger angle range is an improvement compared to existing optical phased arrays. Moreover, the smaller wavelength range lowers the requirements on the laser.

The dispersion engineered phased array can be used as a beam steering device for compact LiDAR or ranging systems, line-of-sign communication systems and projection systems which rely on a scanning beam. As the beam deflects light with a different wavelength under different angles it can also be used as a compact spectrometer.

In one embodiment a 2D phased array comprises a splitter that divides the input light from a wavelength tunable laser to the modulators; modulators that tune the phase of the individual waveguides for transverse steering; and dispersion engineered phased array that can sweep the longitudinal direction by changing the wavelength.

In one aspect, the invention provides an optical phased array device comprising a photonic crystal having a dispersion engineered slow light waveguide region; a mode coupler region capable of optically coupling an input waveguide to the dispersion engineered slow light waveguide region; and optical antenna regions integrated within the dispersion engineered slow light waveguide region; wherein the dispersion engineered slow light waveguide region has a substantially linear dispersion relation within a predetermined operational bandwidth of the optical phased array device; wherein the optical antenna regions are formed by an alteration of a periodic structure of the photonic crystal; wherein the optical antenna regions are capable of radiating light out from the dispersion engineered slow light waveguide region. The optical phased array device may also include multiple such photonic crystals stacked next to one another. The multiple photonic crystals may be regions of a single monolithic photonic crystal. The optical phased array may also include an optical splitter having multiple outputs and multiple phase modulators connected to the multiple outputs and to the multiple photonic crystals.

The dispersion engineered slow light waveguide region preferably has an average group index substantially larger than 7 within a predetermined operational bandwidth. For example, the average group index may be substantially equal to 25. The dispersion engineered slow light waveguide region preferably has a dispersion relation that deviates less than 10% or 20% from linear within a predetermined operational bandwidth of the optical phased array device.

The optical phased array device may also include an input waveguide region. The optical phased array device may also include a layer above the photonic crystal waveguide capable of facilitating radiation of light out from only one side of the dispersion engineered slow light waveguide region. The optical antenna regions in some implementations have different radiation scattering strengths.

BRIEF DESCRIPTION OF THE SEVERAL VIEWS OF THE DRAWINGS

FIG. 1A is a schematic diagram of a 2D OPA, illustrating longitudinal and transverse beam steering, according to an embodiment of the invention.

FIG. 1B is a side cross-sectional view of a 1D phased array shown illustrating the construction of a wavefront by phase differences between antenna elements, according to an embodiment of the invention.

FIG. 2C and FIG. 2D show the final optimized structure of the slow light PhC waveguide and its corresponding Electric field magnitude, respectively, according to an embodiment of the invention.

FIG. 2E is a graph of the dispersion curve of the final optimized waveguide structure shown in FIG. 2C, according to an embodiment of the invention.

DETAILED DESCRIPTION OF THE INVENTION

Figure 1C:
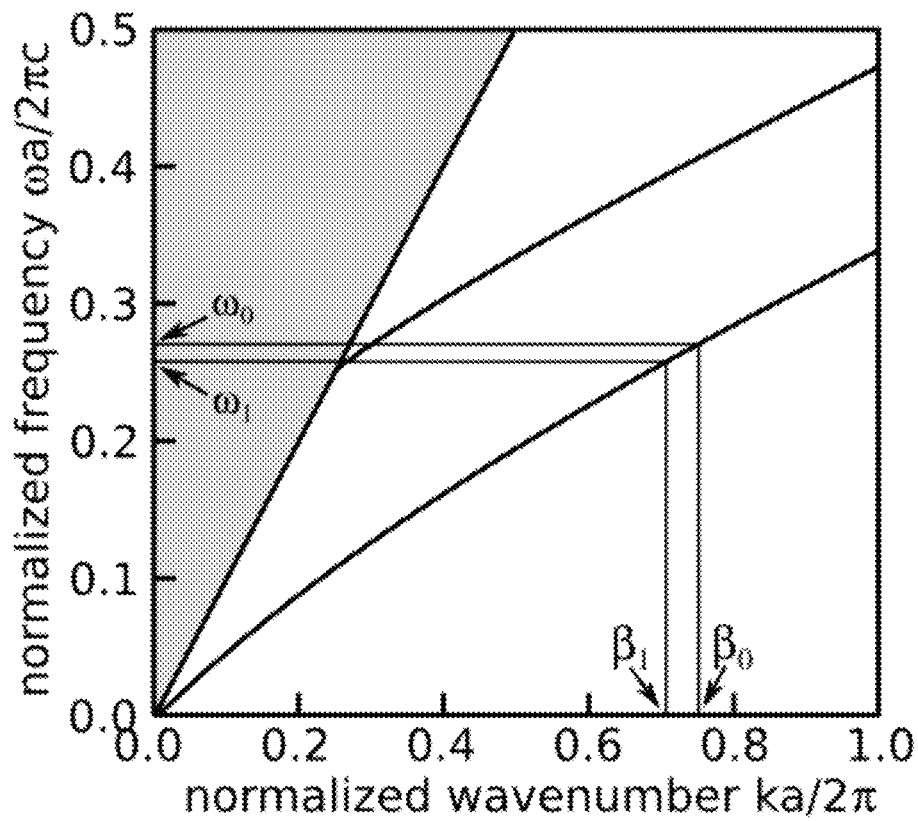
FIG. 1C and FIG. 1D illustrate the dispersion relations for a simple strip waveguide and a slow light photonic crystal waveguide, respectively, according to an embodiment of the invention.

In one embodiment of the invention, an optical phased array is provided based on a slow light waveguide capable of steering a large angle range with a limited bandwidth. The dispersion relation of the slow light waveguide is optimized to be near-linear with an average group index of 25 in the intended operating bandwidth. Additionally, a mode converter and antennas efficiently couple light in to and out of the slow light waveguide. The resulting OPA is capable of steering the optical beam 19° by scanning from 1543 nm to 1566 nm.

The term "slow light waveguide" is a well-known term in the art that refers to waveguides in which light propagates at a very low group velocity due to its interaction with the medium in which the propagation takes place. Simple slow light waveguides suffer from strong higher-order dispersion and limited bandwidth, limiting their use dramatically. In contrast, embodiments of the present invention provide a dispersion engineered optical phased array including a slow light waveguide, the slow light couplers, and antennas integrated into the waveguide. The performance of the OPA is significantly superior to prior devices.

To fully appreciate the present invention and the design challenges it overcomes, the following description introduces principles of optical phased arrays and inverse design techniques.

Optical Phased Arrays

An OPA radiates a beam in a given direction when the phase relation between its antennas matches the phase profile of that beam. This is illustrated in the case of the 1D phased array shown in FIG. 1B. Three antennas 110, 112, 114 are positioned along the length of a slow light waveguide 116. As light 118 propagates along the waveguide, its phase changes, resulting in antennas radiating with a small phase difference that depends on the spacing $d_{ant}$ between the antennas, the wavelength $\lambda$ of the light, and the index of refraction of the waveguide at $\lambda$. The combined radiation forms the wavefront 120 represented by $k_{air}$. If the phase relation between the antennas is altered by changing $\lambda$, the angle of this wavefront changes.

For a 2D OPA, as shown in FIG. 1A, there are multiple 1D phased array lines arranged parallel to each other. Light is input through a main waveguide 100 and is divided by a splitter tree including splitters such as 102 to deliver light to the input waveguides such as 104 that enter the 1D phased array lines that contain antennas such as 106. Using phase shifters positioned at the start of each waveguide, each 1D array line is thus fed light with controlled phase. The phase relation between the different waveguides results in steering of the beam in the transverse direction, defined by the angle $\theta$, while the phase relation along the waveguide steers in the longitudinal direction, defined by the angle $\Psi$.

The phase relation between the antennas along the longitudinal direction of the waveguide can be understood by the grating equation:

$$k_{airx} = \beta + m \cdot k_{ant} \quad (1)$$

where $k_{airx}$ is the projection of the wavefront wavevector on the x-axis, i.e. the waveguide direction, $\beta$ is the wavenumber of the waveguide mode, m is an integer, and $k_{ant} = 2\pi/d_{ant}$ is the wavenumber of the periodically placed antenna with period $d_{ant}$. As the wavelength changes, so do $\beta$ and $k_{air}$. FIG. 1C shows the relation between these wavenumbers and the frequency, i.e., the dispersion relation, for a simple strip waveguide. When the frequency shifts from $\omega_0$ to $\omega_1$, the wavenumber of the first mode increases from $\beta_0$ to $\beta_1$. The resulting change in the radiation angle can be understood by eq. 1, depicted with vectors in FIG. 1F and FIG. 1G. As $\beta$ decreases, the wavevector of the radiated light rotates slightly counter-clockwise. Since the slope of the dispersion curve is relatively steep this change is not necessarily very pronounced. In case of a Si waveguide, one typically needs about 100 nm to shift the beam by 14°.

Figure 1D:
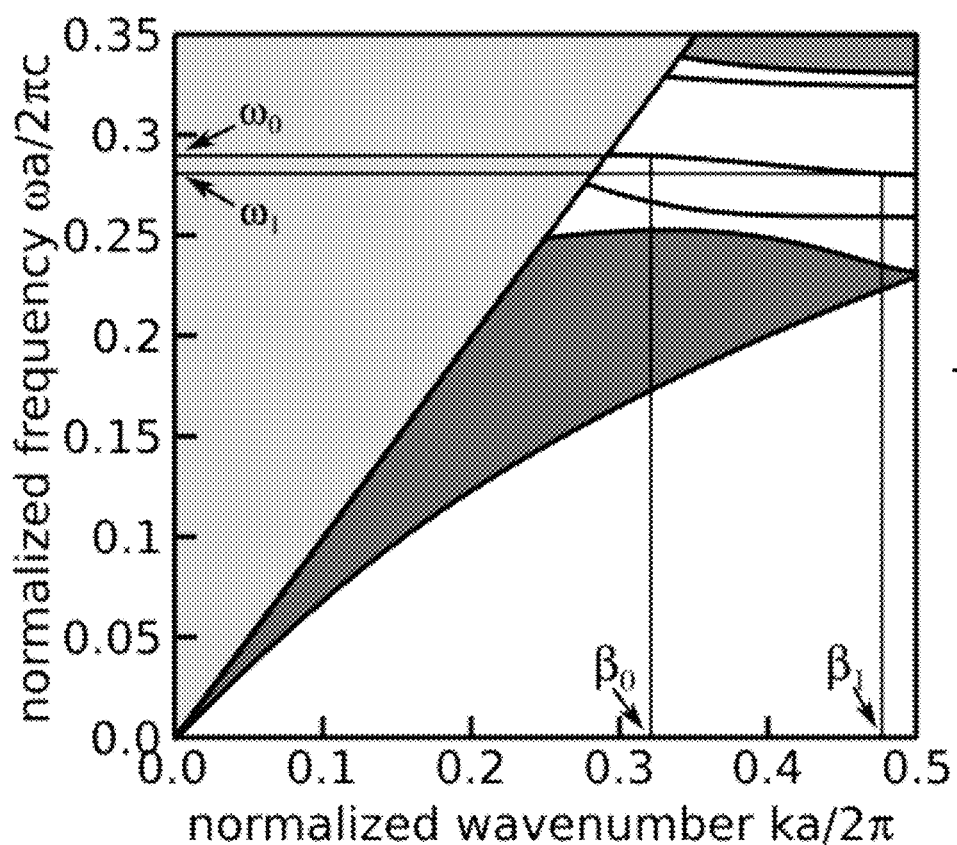
Figure 1E:
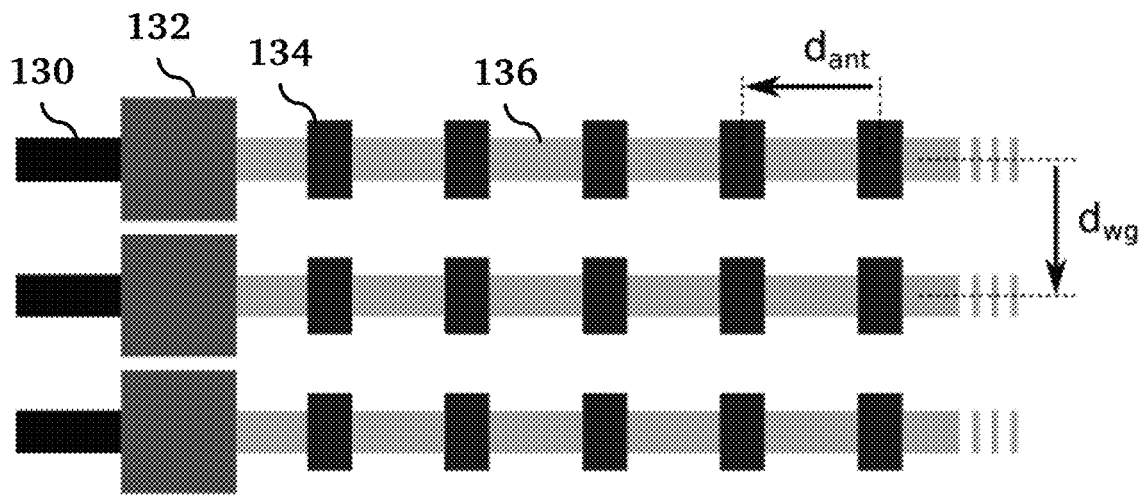
FIG. 1E is a schematic diagram illustrating the combination of components to form a 2D OPA device, according to an embodiment of the invention.
Figure 1F:
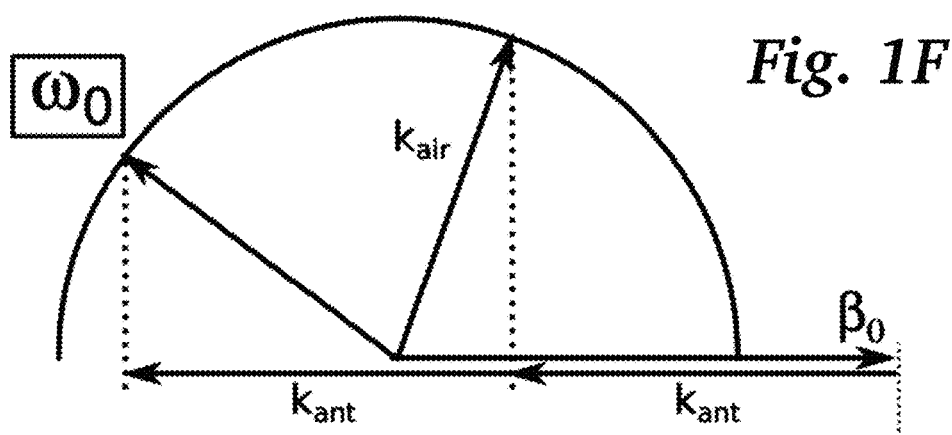
FIG. 1F and FIG. 1G are vector graphs illustrating the radiation angle for an OPA with simple strip waveguide at two frequencies $\omega_0$ and $\omega_1$, respectively, according to an embodiment of the invention.
Figure 1G:
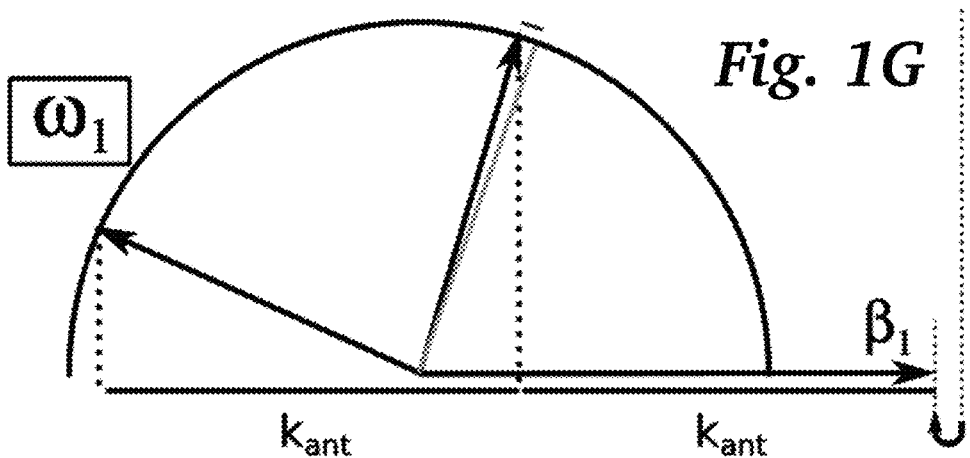
Figure 1H:
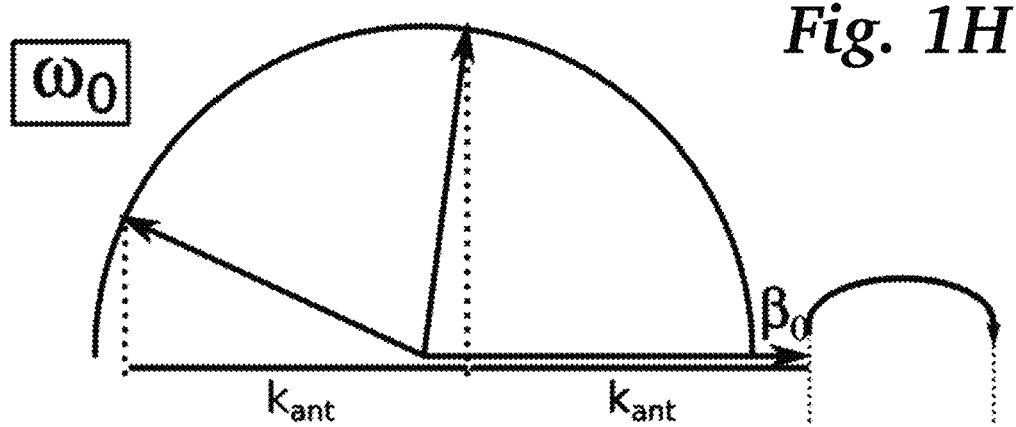
FIG. 1H and FIG. 1I are vector graphs illustrating the radiation angle for an OPA with slow light waveguide at two frequencies $\omega_0$ and $\omega_1$, respectively, according to an embodiment of the invention.
Figure 1I:
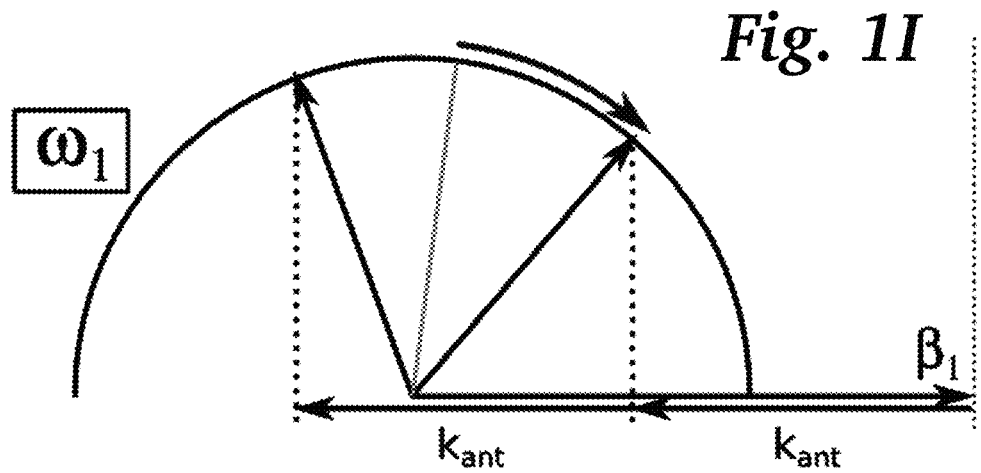

The dispersion relation of the waveguide determines how sensitive the OPA's radiation angle is to a change in wavelength. If the dispersion curve has a low slope, then the waveguide's wavenumber will change significantly and, as a result, so will the radiation angle. This is the case for a slow light waveguide, which is characterized by a low group velocity, $v_g = \partial\omega/\partial k$ or a large group index $n_g = c/v_g$. An example of a dispersion relation for a slow light photonic crystal waveguide is shown in FIG. 1D. As the frequency decreases, $\beta$ dramatically increases. FIG. 1H and FIG. 1I show vector representations of the grating equation for $\omega_0$ and $\omega_1$. The same frequency change as in FIG. 1D OPA's radiation direction rotates considerably more.

Designing a full 2D OPA which can steer longitudinally by changing the wavelength may be performed by optimizing several photonic components. First of all, we require slow light waveguide that operates in a specific bandwidth, e.g., the tuning range of the laser used for the OPA setup, and provides a substantial change in the wavenumber within that bandwidth. Additionally, it is desirable to have a linear or near-linear dispersion relation in this bandwidth. (Here, "near linear" is defined as variation from linearity by less than 10% over the operational wavelength range.) Secondly, a mode converter is used to couple a strip waveguide to the photonic crystal (PhC) waveguide. The slow light mode can have little overlap with that of a strip waveguide, and the different dispersion relation can lead to strong impedance mismatch, both of which lower the coupling efficiency between the waveguides. A mode converter is thus used to facilitate this transition. Finally, the device needs to gradually radiate the light from the photonic waveguide via an antenna. Simple partially etched notches, used in OPA's relying on strip waveguides, are not an option here. We thus design an antenna structure in our slow light waveguide. FIG. 1E illustrates how these different components are combined into an OPA device, where for simplicity the initial portion of three waveguide line arrays are shown. In the top line array, an input strip waveguide 130 joins a mode converter 132 that couples the incoming light to the slow light waveguide 136 which contains antennas 134 integrated into it.

Before discussing the slow light OPA elements, we shortly review photonic inverse design problems. Inverse design problems for optical devices typically are of the following form:

minimize $f_{obj}(p, E_1, \ldots, E_n)$ with respect to $p, E_1, \ldots, E_n$ subject to the constraints $$h_{EMi}(p, E_i) = 0, i = 1, \ldots, n, \text{ and } h_{fab}(p) = 0. \quad (2)$$

The objective function, $f_{obj}$, defines a figure of merit, which needs to be minimized as a function of a parameterization, p, which describes the device structure, and the optical fields, $E_i$, for n different modes indexed by i. The optical fields are linked to the structure by constraining the field solutions to Maxwell's equations, as represented by $h_{EM}$. Furthermore, the structure can be subjected to additional constraints, most commonly a fabrication constraint, $h_{fab}$ to ensure the design can be fabricated.

Slow Light Waveguide

The aim of the slow light waveguide design is to obtain periodic structure with a nearly-flat, linear dispersion relation, within a certain bandwidth. Different figures-of-merit can be devised for this. The most direct way is to minimize the absolute difference between the group velocity of the structure and the desired group velocity for in a series of wavevectors, $k_i$. While effective, this method is computationally heavy and as such, not ideal for a 3D structure. Alternatively, for a series of wavevectors we can optimize the difference between the frequencies. In this case the objective function becomes:

$$f_{obj}(p) = F(\{(\omega_i(p) - \omega_{i+1}(p) - \Delta\omega_i)^2 | i=1, \ldots, n-1\}), \quad (3)$$

where $\omega_i$ is the angular frequency associated with $k_i$, and $\Delta\omega_i$ is the target frequency difference. Considering we want to reach a certain group index, $n_g$, the $\Delta\omega_i$ will be $(k_{i-1} - k_i)/n_g$. F can be the sum of the set, the maximum or the softmax.

The underlying physics constraint, $h_{EM}$, for this optimization problem describes the dispersion relation, which results from the eigenvalue problem:

$$h_{EMi} = \nabla_k \times (1/\mu) \nabla_k E_i - \omega_i^2 \varepsilon(p) E_i = 0, i = 1, \ldots, n, \quad (4)$$

where $\mu$ is the magnetic permeability, which we take to be one here, and $\varepsilon(p)$ is the permittivity of the structure, parameterized by p. $\nabla_k \times$ is the curl-operator taking the Bloch boundary condition for wavevector, k, into account.

Photonic Crystal Waveguide Coupler

For the couplers, we optimize the transmission in the waveguide mode. Considering we normalized the input power of the source, the objective then becomes:

$$f_{obj}(E_1, \ldots, E_n) = \Sigma_{i=1, \ldots, n} 1 - (C_i \cdot E_i)^2, \quad (5)$$

where $C_i$ represents a vector which will integrate the power transmitted in waveguide mode for $\omega_i$.

Here the fields, $E_i$, result from the sources, $J_i$, corresponding either the input waveguide mode or a vertically incident Gaussian beam, in case of waveguide coupler or grating coupler, respectively. As such, the EM constraint becomes:

$$h_{EM} = \nabla \times (1/\mu) \nabla \times E_i - \omega_i^2 \varepsilon(p) E_i + j\omega J_i = 0 \quad (6)$$

Slow Light Waveguide

Figure 2A:
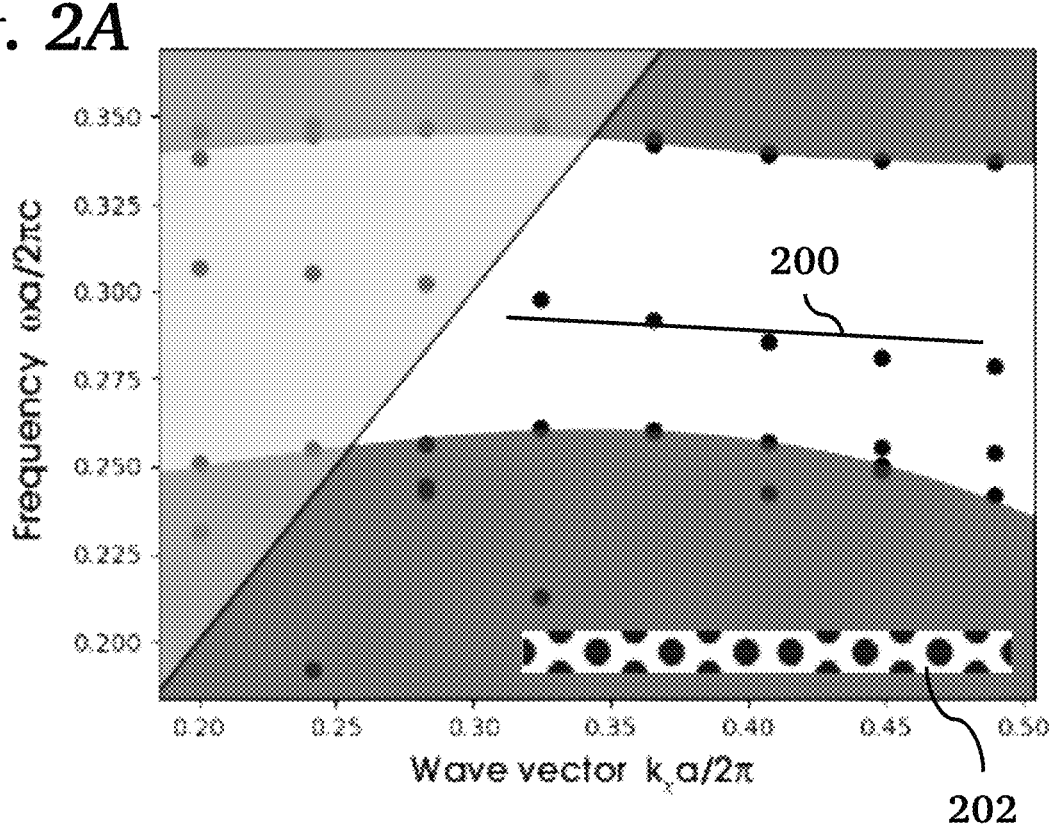
FIG. 2A is a graph of the dispersion relation of a PhC slow light waveguide, according to an embodiment of the invention.
Figure 2B:
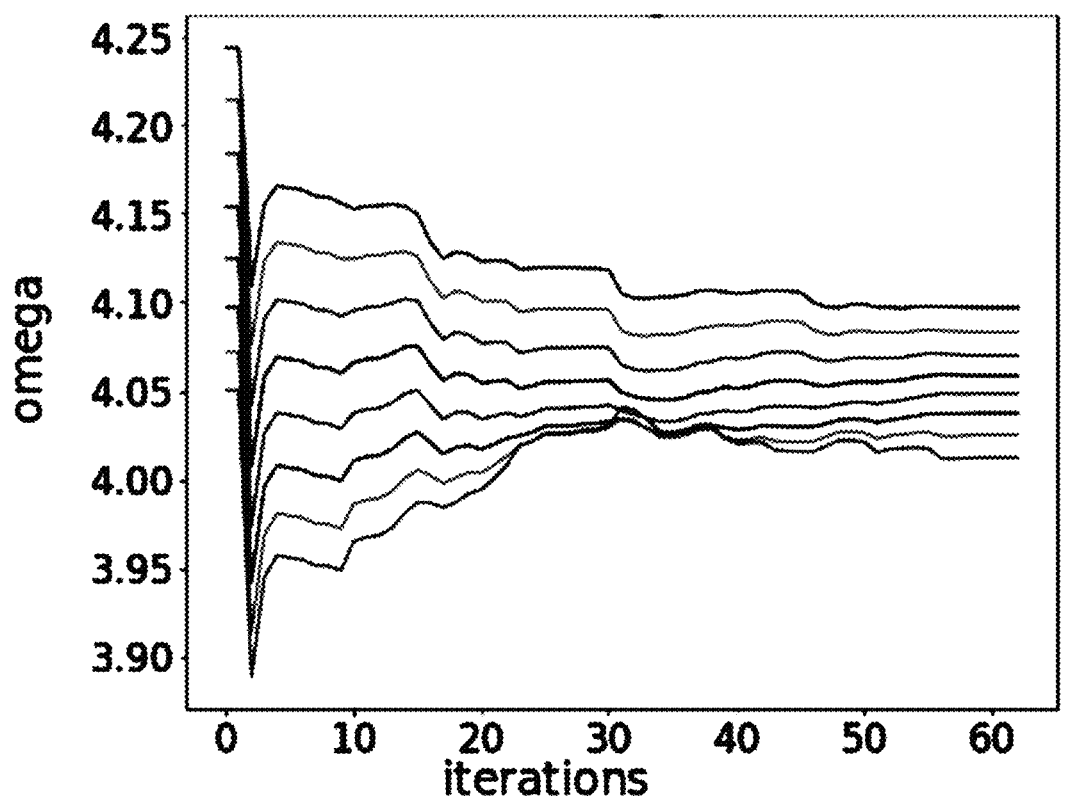
FIG. 2B is a graph of angular frequencies of eight modes during the design optimization during process, according to an embodiment of the invention.

The slow light waveguide is optimized based on the optimization problem in eq. 2 with eq. 3 as objective functions. We rely on simple sum function for F. FIGS. 2A-2E show an example optimization. FIG. 2A shows the dispersion relation of the PhC waveguide even mode indicated in the inset 202, which is used as an initial condition. The band diagram for the even modes is shown. We intend to use mode around $\omega a/2\pi c=0.29$, but we desire a flatter dispersion than the initial condition. The slope of the curve should match that of the line 200.

The optimization is done using eight modes to form the objective function in eq. 3. The trajectory of the angular frequencies during the optimization can be seen in FIG. 2B, which shows angular frequencies of the eight modes used during the optimization process. Over 60 iterations, the frequencies move closer together and become more equally spaced. The dispersion curve of the final optimized structure is shown in FIG. 2E. The dispersion relation forms a line spanning a normalized wave number interval of about 0.10 over a 0.004 normalized frequency interval, resulting in an average group index of about 25. The final structure of the slow light PhC waveguide and Electric field magnitude for $\omega=4.05$ can be seen in FIG. 2C and FIG. 2D, respectively.

Slow Light Waveguide Coupler

Figure 3A:
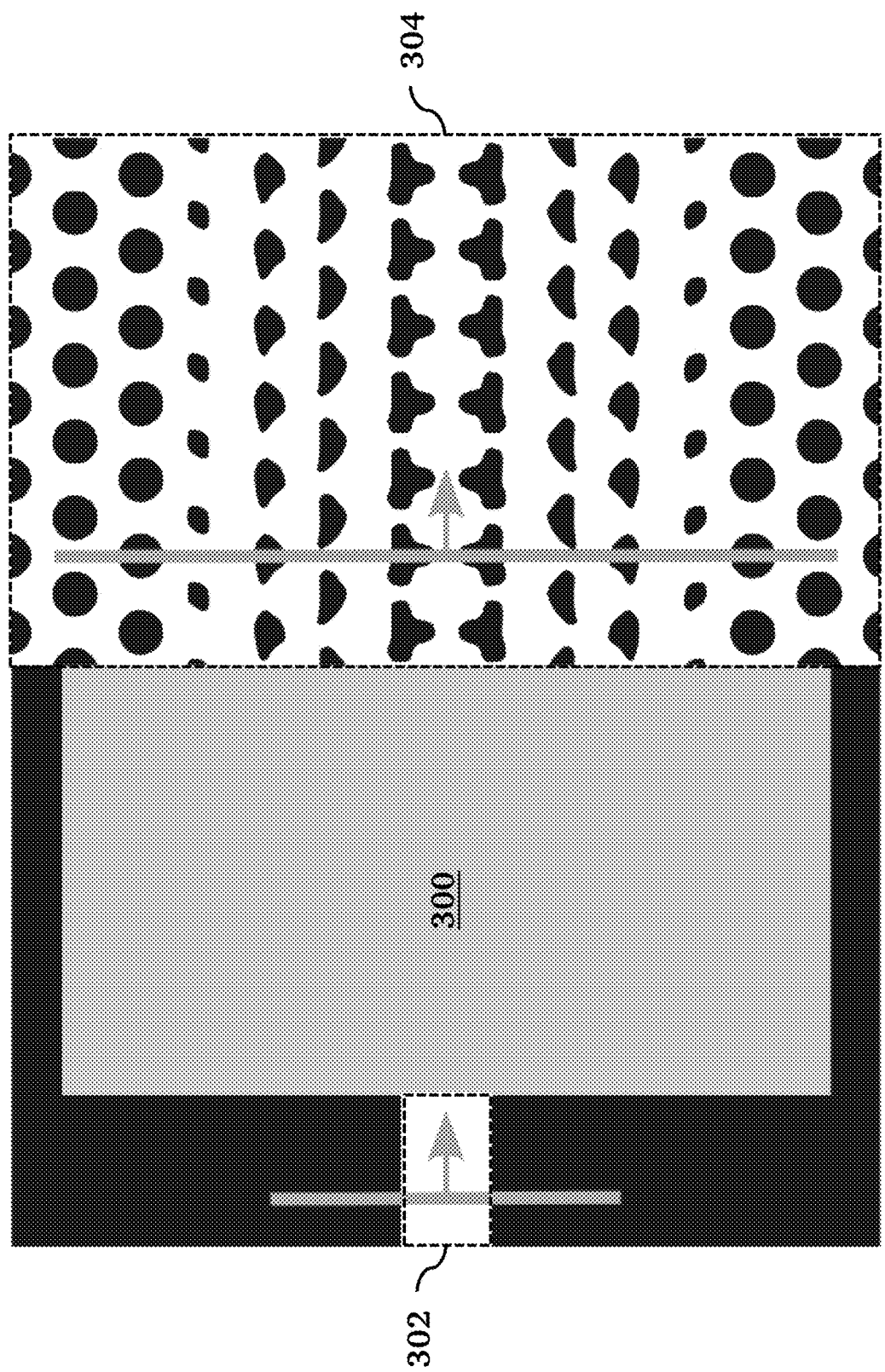
FIG. 3A is a schematic top view of a simulation set-up used to design a mode coupler region, according to an embodiment of the invention.
Figure 3B:
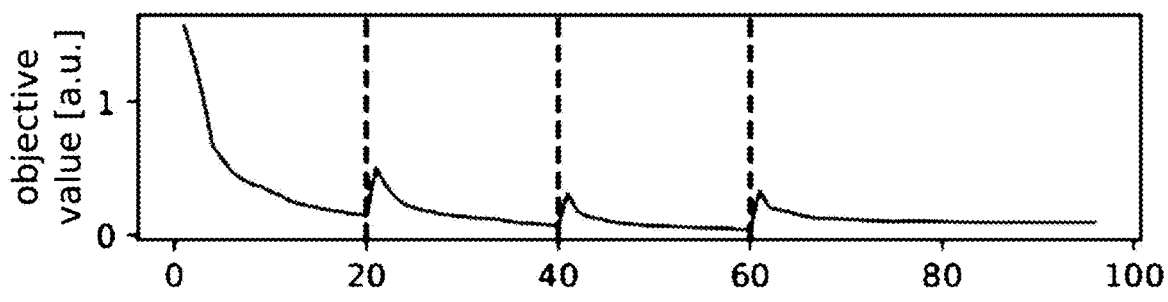
FIG. 3B and FIG. 3C are graphs showing the objective value and efficiency, respectively, of a mode coupler at different iterations of the design optimization, according to an embodiment of the invention.
Figure 3C:
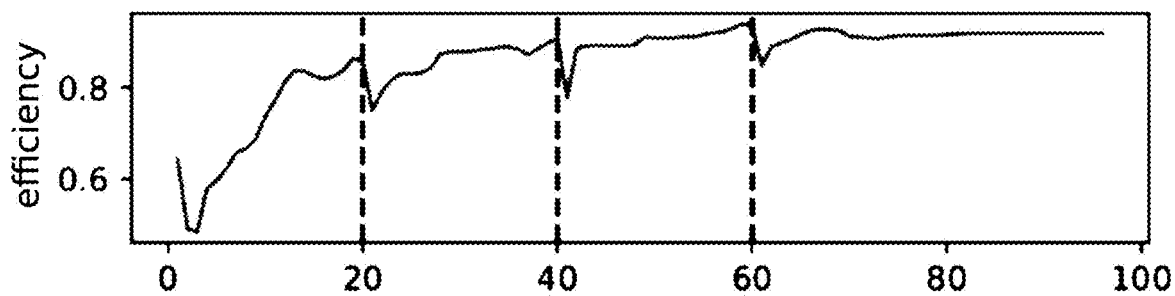
Figure 3D:
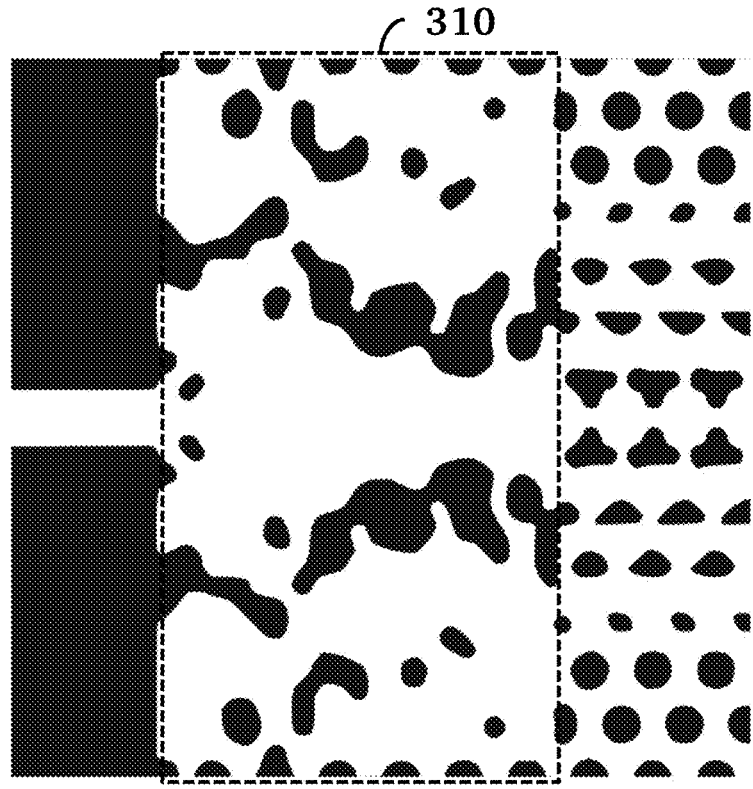
FIG. 3D shows the final optimized structure of a coupler region, according to an embodiment of the invention.

To route light on-chip to the slow light OPA, one would most commonly use a simple strip waveguide. The modal field profile of the PhC waveguide, which can be seen in FIG. 2D, is quite extended and will thus have a low overlap with that of an input strip waveguide. This will lead to low coupling efficiency. A mode coupler is therefore used. The simulation set-up to design this component of the device is shown in FIG. 3A. The gray region 300 depicts the design area. On the left of this region is the input strip waveguide region 302, where a source, $J_i$ emits light in the waveguide's fundamental mode. The slow light PhC waveguide region 304 is positioned on the right of the design area. The objective function, eq. 5 evaluates the modal overlaps, $C_i$, of the PhC for four frequencies, corresponding to the normalized wavenumbers $ka/2\pi=[0.35, 0.376, 0.403, 0.43]$. To ensure a measure of fabricability, we add a fabrication penalty term to the objective, which penalized feature larger than 80 nm. FIG. 3B and FIG. 3C show the objective value and efficiency during the optimization, respectively. Over 95 iterations using L-BFGS-B, the optimization reaches an average coupling transmission of 91%. The final optimized structure of the coupler region 310 can be seen in FIG. 3D.

Slow Light Waveguide Antenna

Figure 4A:
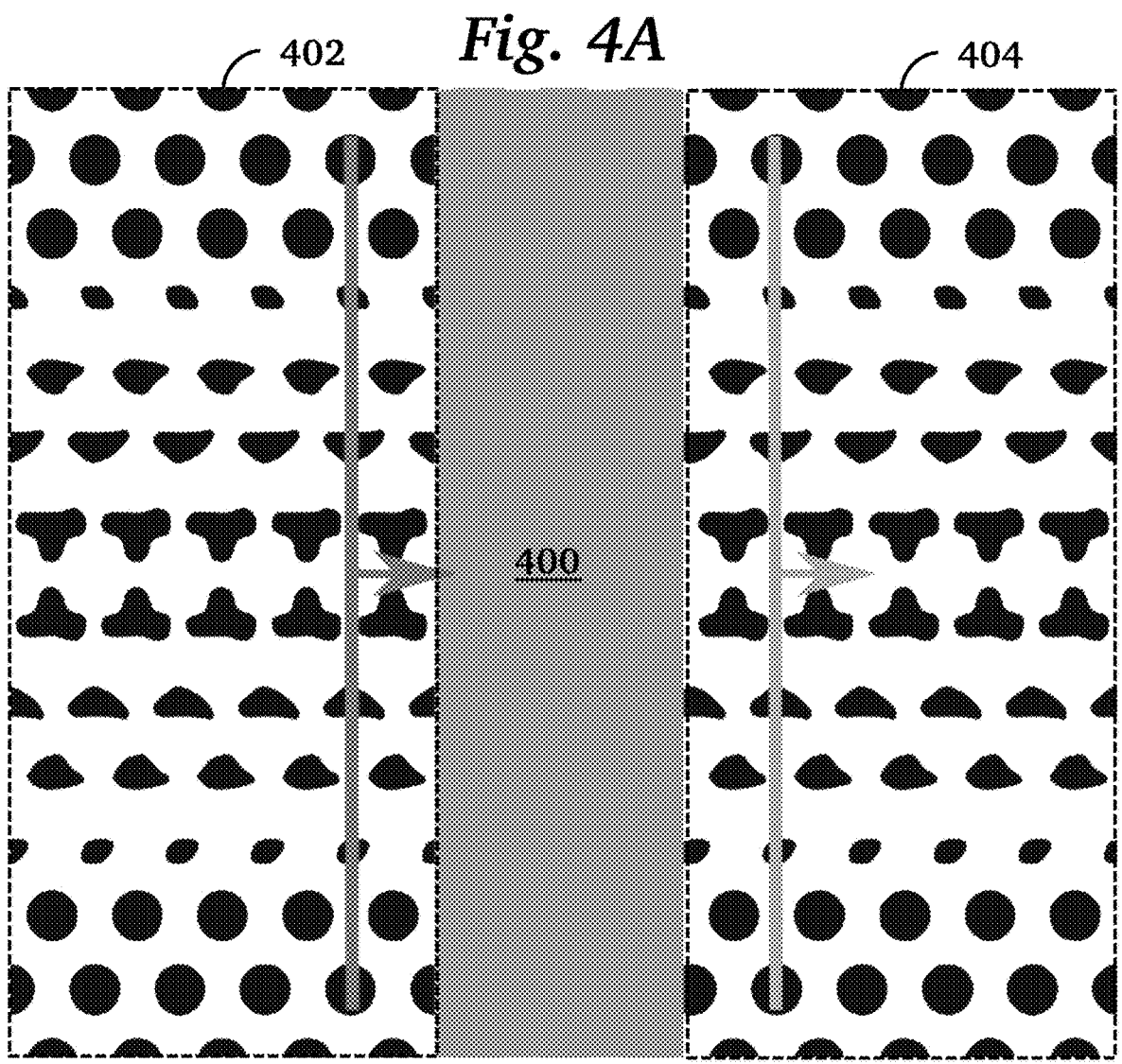
FIG. 4A and FIG. 4B are schematic top and side views, respectively, used to design antenna regions, according to an embodiment of the invention.
Figure 4B:
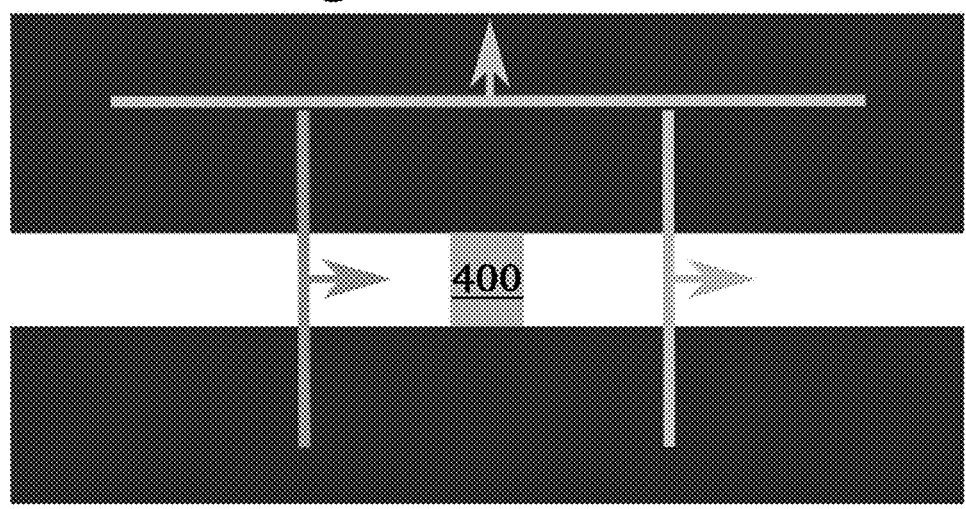

To use the slow light waveguide as an OPA, we integrate antennas in the waveguides, as depicted in FIG. 1E. The simulation setup used to design these antennas is shown in FIG. 4A (top view) and FIG. 4B (side view), where the antenna design area 400 in shown within the slow light waveguide 402 and 404.

Figure 4C:
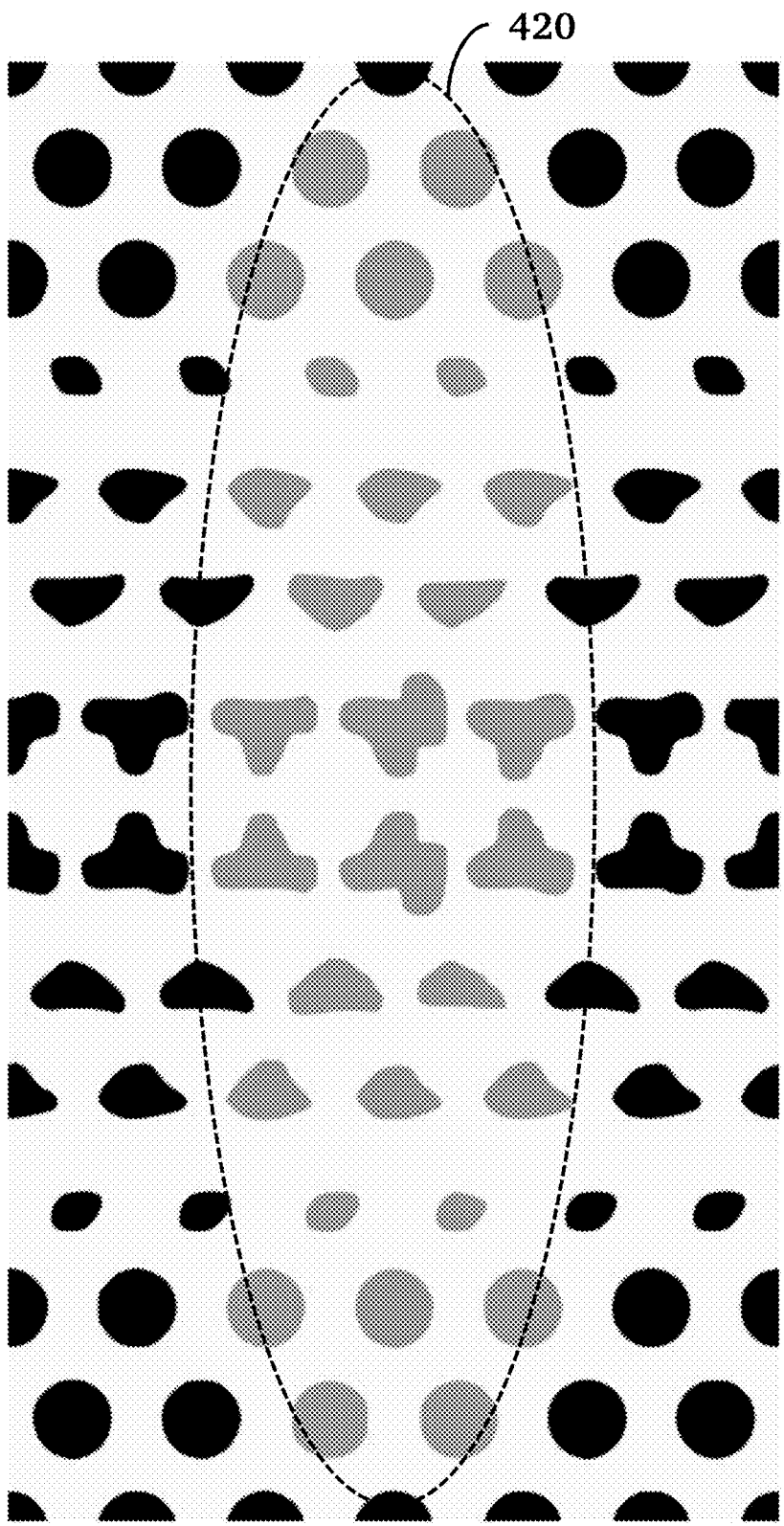
FIG. 4C shows the final optimized structure of an antenna region, according to an embodiment of the invention.
Figure 4D:
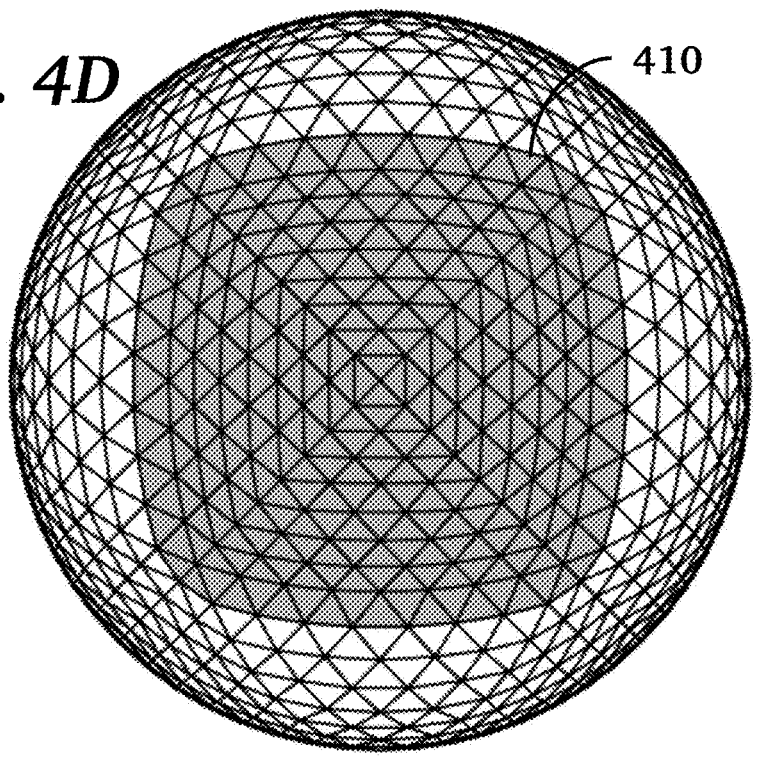
FIG. 4D illustrates a far-field window used in the optimization of an OPA device, according to an embodiment of the invention.

Light is emitted in the slow light mode from the right side of the design area 400. On the left, we evaluate the transmitted light in the slow light mode by relying on the mode overlap objective function, eq. 5. In addition, we also evaluate light emitted in the far field. For this, we project the local fields in a slab above the design region onto a sphere. An extra objective function, $f_{ffobj}$, is therefore added to the previous overlap objective function. The form of this objective is as follows:

$$f_{ffobj}(E_1, \ldots, E_n) = \Sigma_{i=1, \ldots, n} T_{ff} - \int_\Omega (\frac{1}{2}) |F_{ff}(E_i)|^2, \quad (7)$$

nowhere $T_{ff}$ is the target transmitted light in the far field and $F_{ff}$ is the near-to-far-field transformation. $\Omega$ is the region of interest in the far field, i.e., the window on the sphere over with we integrate the projected fields. The window used in the optimization is the shaded region 410 shown in FIG. 4D. It integrates a cone perpendicular to the OPA surface since this is the region we intend to scan with the OPA. Both the objective function that evaluates the transmission in the PhC waveguide's mode as well as the objective function that evaluates the far field transmission use four modes, i.e., the same frequencies as were used for the coupler.

Figure 4E:
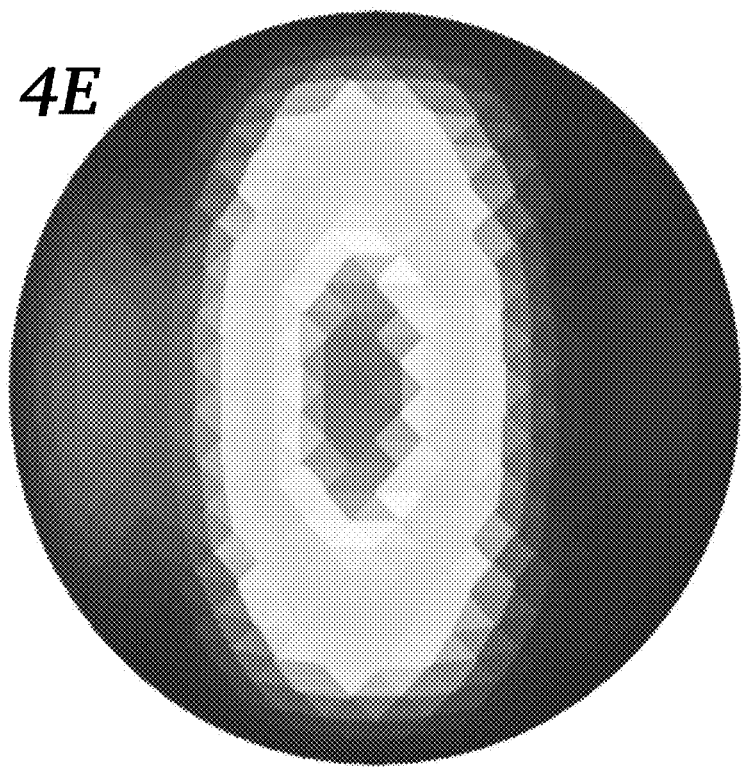
FIG. 4E illustrates a far field radiation pattern of an optimized OPA device, according to an embodiment of the invention.

The optimization starts with an initial parametrization that matches the PhC waveguide structure with some small random alterations. After optimization, we obtain for the antenna region 420 the structure shown in FIG. 4C. The largest change is the extended hole in the center line. This alteration of the periodic structure radiates about 5.5% to the far field. $T_{ff}$ was set to 2.5%, which is half the intended radiated power since our fully etched structure will radiate equally up and down. FIG. 4E shows the far field radiation pattern of the final structure. The radiation forms a lobe perpendicular to the OPA surface that overlaps with the target cone 410 shown in FIG. 4D.

Slow Light Optical Phased Array

Figure 5A:
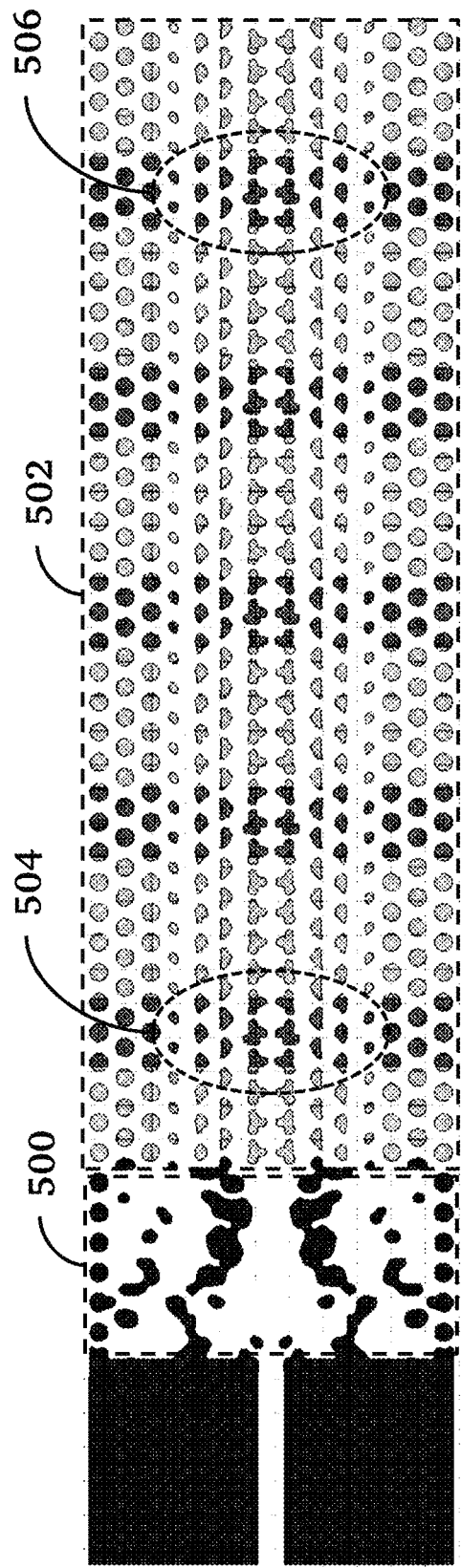
FIG. 5A shows the structure of a 1D PhC OPA, according to an embodiment of the invention.

The mode coupler region 500, waveguide region 502, and antenna regions 504 through 506 are combined into a 1D OPA line, as shown in FIG. 5A. The performance of the OPA can be evaluated by its far-field emission patterns in the intend operation bandwidth.

Figure 5B:
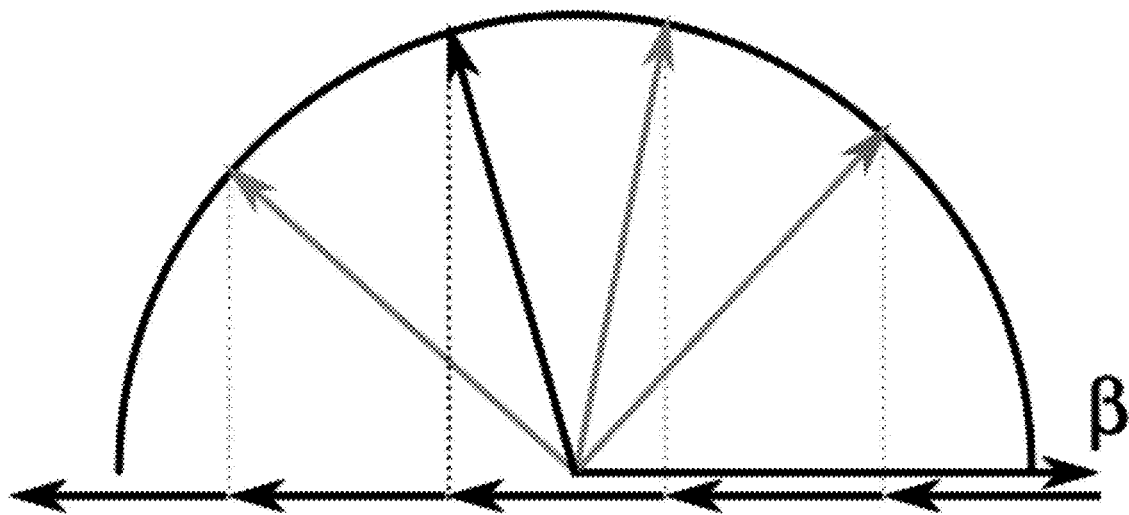
FIG. 5B and FIG. 5C show vector representation of the grating equation and far field pattern for a largest operating wavelength, respectively, according to an embodiment of the invention.
Figure 5C:
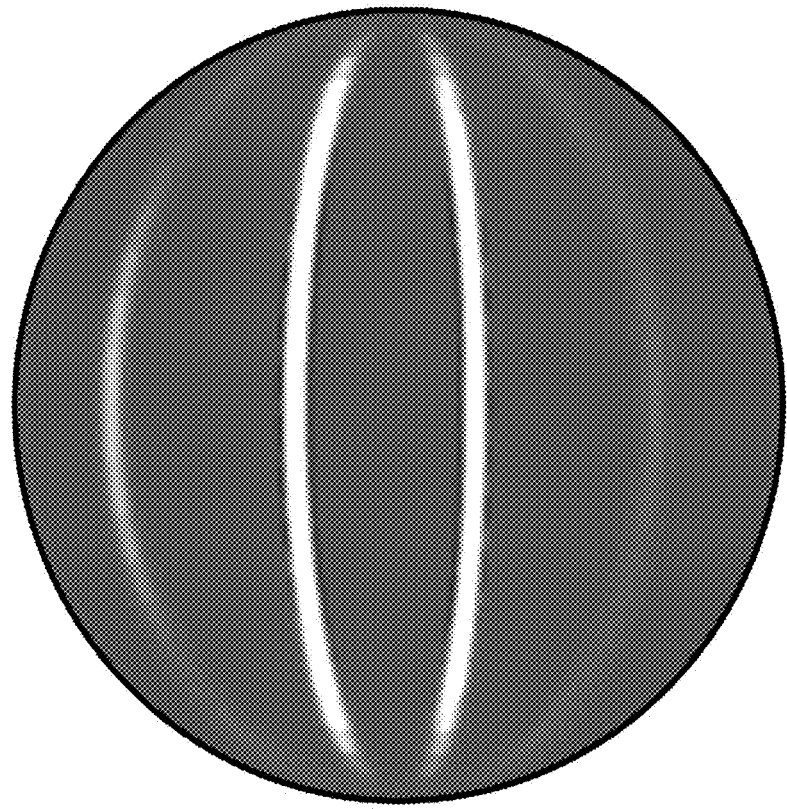
Figure 5D:
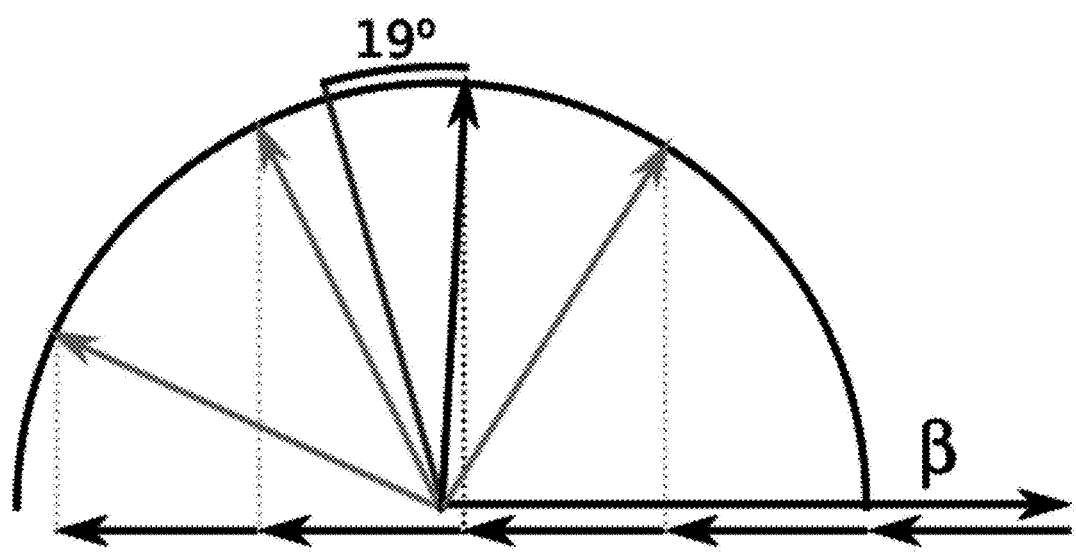
FIG. 5D and FIG. 5E show vector representation of the grating equation and far field pattern for the smallest operating wavelength, respectively, according to an embodiment of the invention.
Figure 5E:
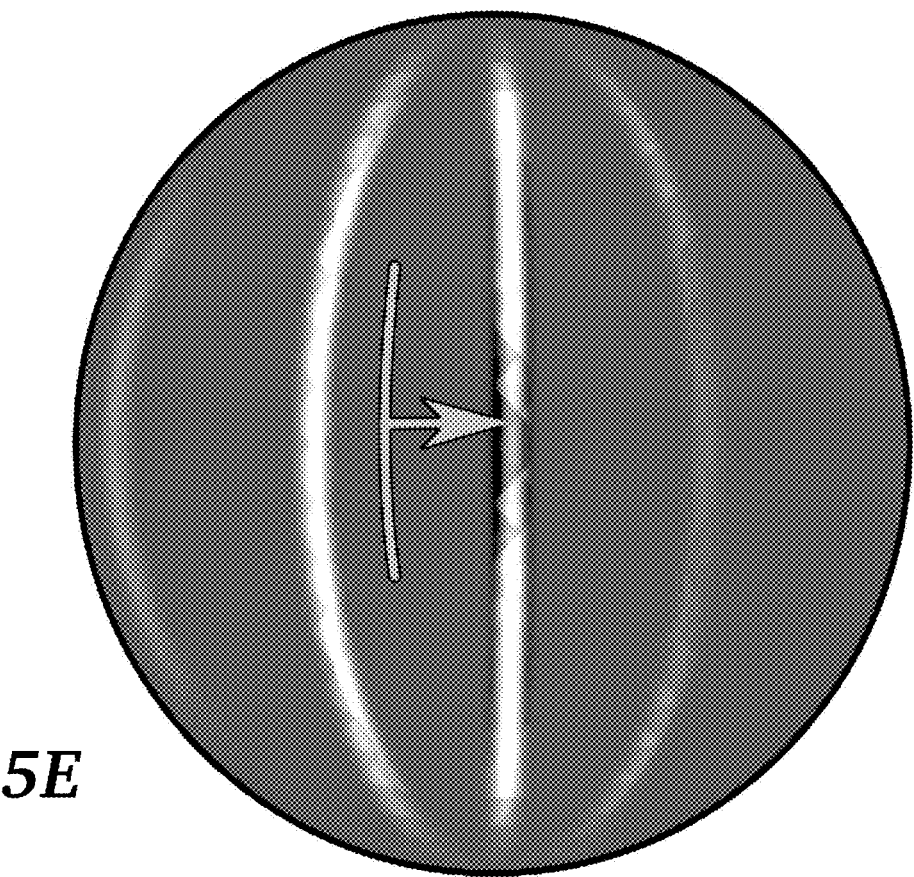

FIG. 5B and FIG. 5C show vector representation of the grating equation and far field pattern for the largest operating wavelength, respectively. FIG. 5D and FIG. 5E show vector representation of the grating equation and far field pattern for the smallest operating wavelength, respectively. These simulated far-field patterns in FIG. 5C and FIG. 5E are driven at the normalized frequency 0.285 and 0.281, respectively. The different radiation modes seen in the plots of FIG. 5B and FIG. 5D match the simulated far-field patterns. Over the frequency shift, the main lobe, i.e., the lobe around the OPA surface normal, shifts 19°. Considering we are working around with an a=440 nm, the wavelength changes from 1543 nm to 1566 nm. The OPA waveguide thus achieves its steering range in 23 nm.

Figure 6A:
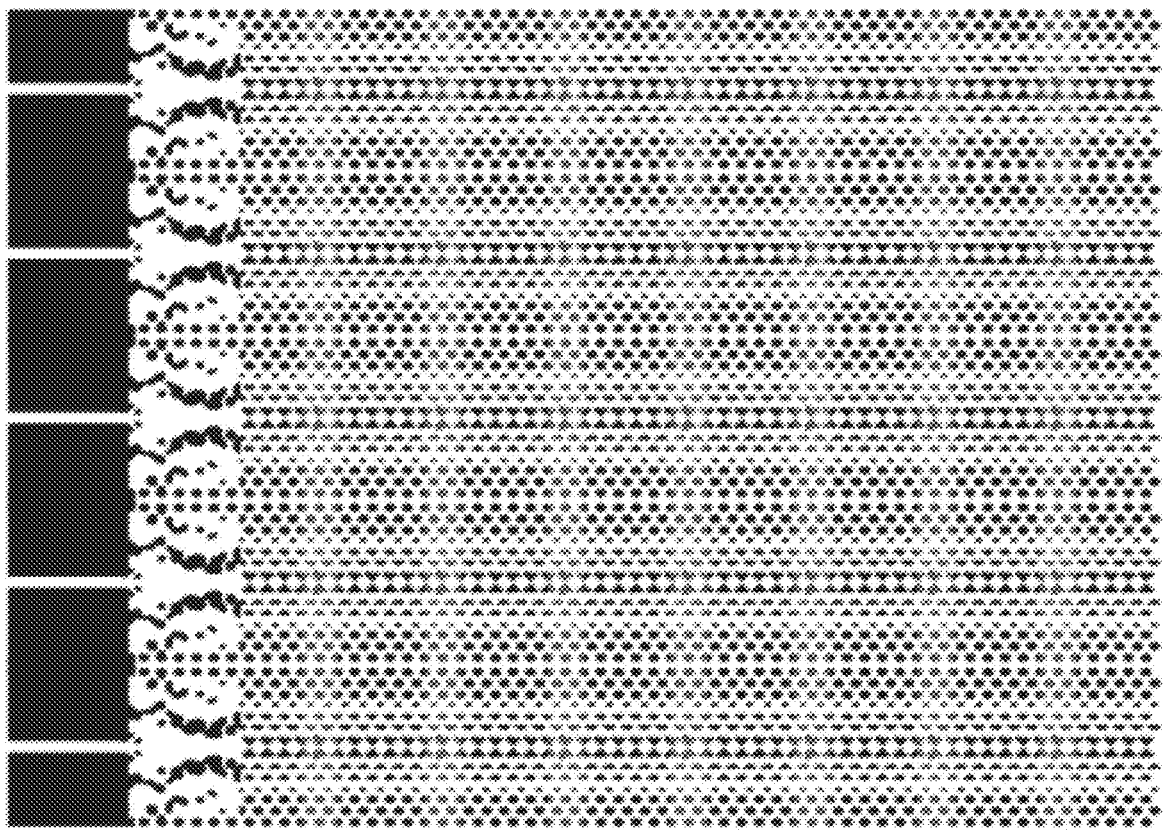
FIG. 6A illustrates stacking of five 1D array lines to form a 2D phased array, according to an embodiment of the invention.
Figure 6B:
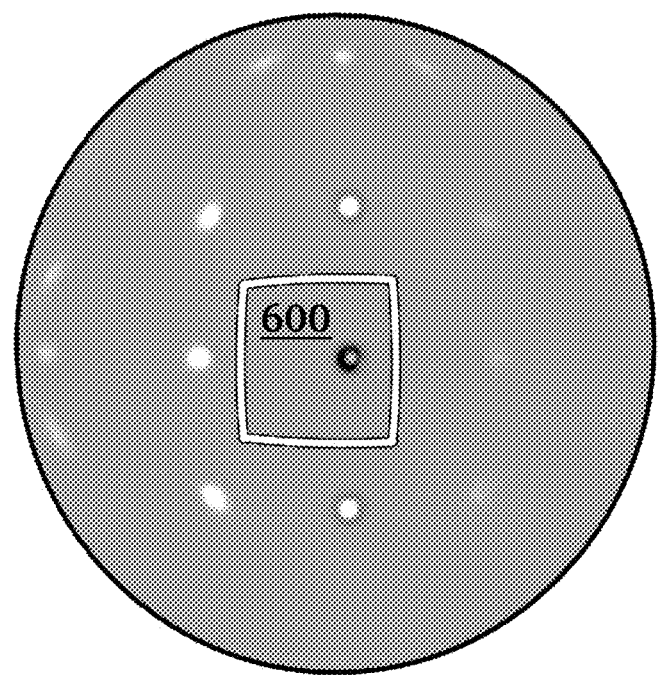
FIG. 6B shows a simulated far field radiation pattern for a 2D OPA, according to an embodiment of the invention.
Figure 6C:
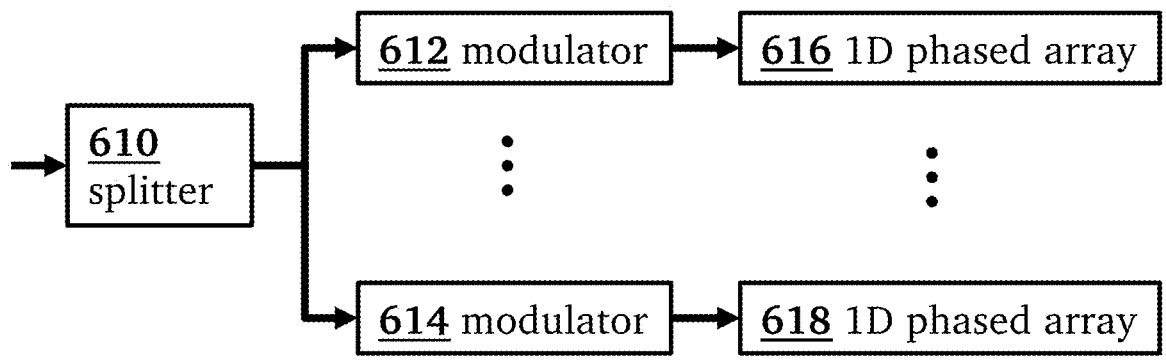
FIG. 6C is a schematic diagram showing how multiple 1D array lines and corresponding phase modulators are fed by a splitter in a 2D OPA, according to an embodiment of the invention.

A 2D phased array can be achieved by stacking the waveguides of FIG. 5A next to one another as shown in FIG. 6A, which illustrates stacking of five 1D array lines. As shown in FIG. 6C multiple 1D array lines 616, 618 are fed by light modulated by corresponding phase modulators 612, 614. The light from a laser is divided by a splitter 610 and then fed into the modulators. As seen in FIG. 6A, the spacing between the different 1D OPA lines is chosen in this implementation to be equal to the antenna spacing along the waveguides, i.e., eight times the PhC crystal periodicity, a. The simulated far field for this OPA can be seen in FIG. 6B. In this instance, the phase at all the input waveguides is considered to be equal. As shown in FIG. 6C, phase modulators 600, 602 capable of changing the phase by $2\pi$ before the 1D OPA lines 604, 606, the beam can also be steered in the transverse direction. The square 600 in FIG. 6B delineates the cone in which the single beam can be steered by changing the wavelength and modulating the phase of the light entering the array lines. This window can be enlarged by decreasing the spacing between the antennas. By designing slow light waveguides with a more confined mode shape, we can place them more closely together, which would result in a larger transverse tuning range. A wider longitudinal tuning range is obtained in this design by increasing the change in the wavenumber that can be achieved and reducing the spacing between the antennas.

Alternative Design:

Combined Antenna and Dispersion Optimization

The design of the antenna can also be combined with the dispersion design. Designing the antenna as a stand-alone defect in the dispersion engineered waveguide has the disadvantage of the antennas interacting when closely spaced. If we want to have very close-packed antennas we can also take up the radiation behavior in a dispersion optimization.

Figure 7A:
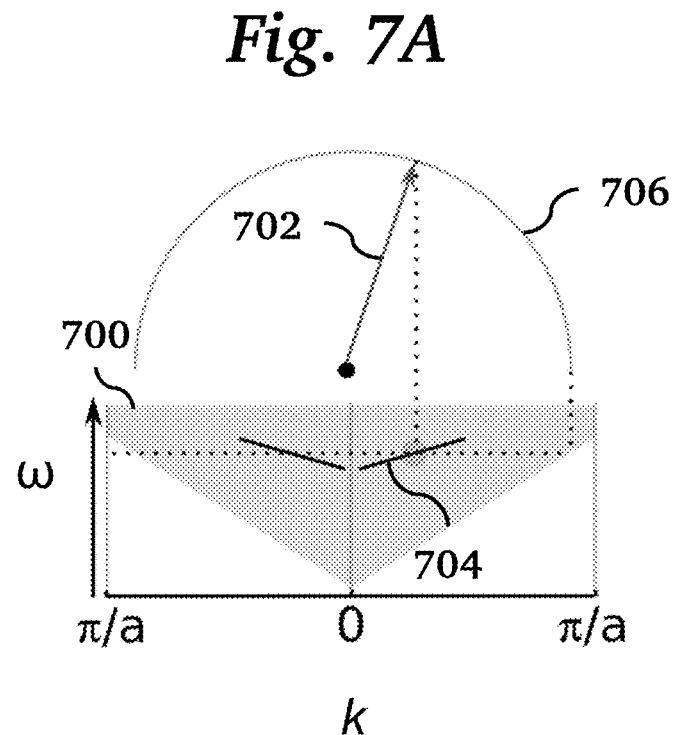
FIG. 7A. is a schematic diagram illustrating how modes in the light cone can couple to free space, according to an embodiment of the invention.

We can do this by optimizing a mode that lies in the light cone 700, as illustrated in FIG. 7A. The modes in the light cone can couple to free space in a free space wavevector 702 whose projection on the waveguide matches the mode's wavevector. The coupling strength to free space, or in other words, the radiation intensity, of the mode is captured by the imaginary component of the mode's wavenumber or the imaginary component of the mode's frequency. The lines 704 represent the waveguide dispersion relation, and the semicircle 706 represents the possible free space light directions at the frequency $\omega$.

Using the complex frequencies, we can now optimize the combined dispersion/antenna structure by the following problem.

Minimize with respect to $p$ $$\Sigma_{k=1,\ldots,n}(\text{Re}\{\omega_{tk}\}-\text{Re}\{\omega_k\})^2+\Sigma_{k=1,\ldots,n}(\text{Im}\{\omega_{tk}\}-\text{Im}\{\omega_k\})^2$$

subject to the constraint $$\nabla_k\times(1/\mu)\nabla_k\times E_k-\omega_k^2\varepsilon(p)E_k=0, k=k_0,\ldots,k_n. \quad (8)$$

The first term in the objective function above accounts for the mode's dispersion by trying to match the real part of the frequency with a target frequency, i.e., a target dispersion relation. The second term in the objective function accounts for the loss. We try to match the imaginary part of the frequency to a target value, which corresponds to the desired radiation loss we want in our OPA.

Practically we can start from a slow light waveguide design as the one obtained above. We now reoptimize this design by altering two or more periods of this design. By changing the periodicity of the waveguide, the bands are pushed in the light cone and couple to free space modes. Starting from the larger period design we now reoptimize using the optimization problem in eq. 8.

Figure 7B:
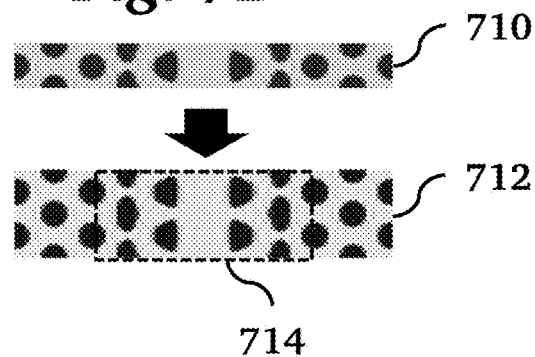
FIG. 7B shows an initial slow light waveguide design that is doubled to obtain an initial condition for the optimization problem, according to an embodiment of the invention.
Figure 7D:
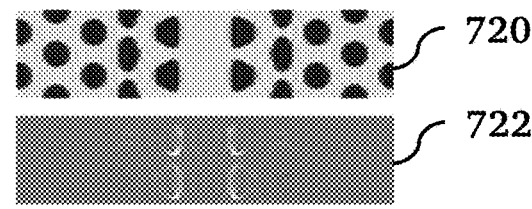
FIG. 7D shows the final structure of the optimization together with a difference image, according to an embodiment of the invention.
Figure 7C:
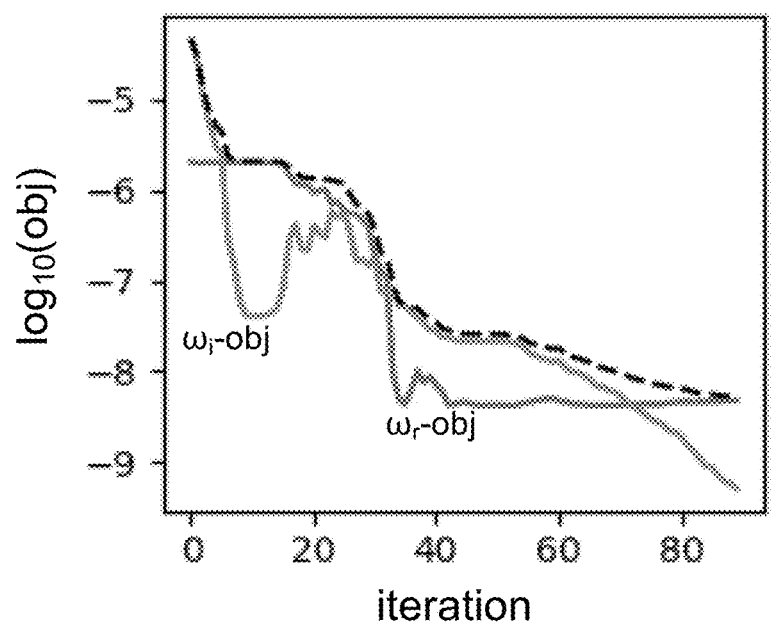
FIG. 7C is a graph of the objective function vs. iteration during the optimization process, according to an embodiment of the invention.
Figure 7E:
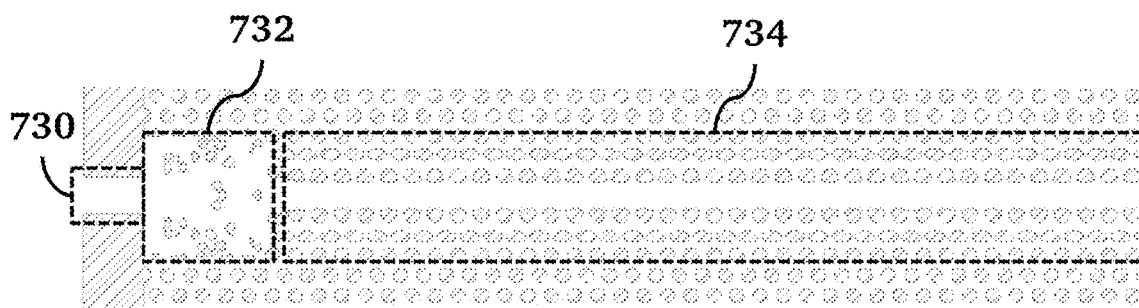
FIG. 7E shows an OPA structure, according to an embodiment of the invention.

An example of an optimization process initialization can be seen FIG. 7B, which shows the initial slow light waveguide design 710 whose period we double to obtain the initial condition 712 containing design area 714 for the optimization problem of eq. 8. FIG. 7C shows the progress of the objective function during the optimization process. Over 87 iterations, the objective function of eq. 8 is minimized. The graph also shows the objective function's first term, $\omega_r$-obj, and second term, $\omega_i$-obj. The final structure of the optimization can be seen FIG. 7D. The design 720 shows little difference with the initial condition. The difference image 722 compares the initial design 712 and the final design 720. We can see that small alterations have been made to create the desired losses. FIG. 7E shows the OPA structure made with this design. Light entering from an input waveguide 730 on the left passes through a coupler region 732 and is then guided through the new waveguide design 734. Unlike the previous design, we cannot indicate distinct antenna regions, since the radiation behavior is built into the waveguide design.

Fabrication

The resulting OPA designs can be fabricated using semiconductor fabrication processes. The designs can be patterned in resist using a lithographic process, such as ebeam or optical lithography (for example ArF immersion, or extreme UV lithography), and subsequently etched in the material systems for which the OPA was designed. These fabrication methods also allow for multi-layer designs. One part of the design, e.g., the slow light waveguide, could be made in one layer, while after deposition processes, a different part, e.g., the antennas, could be fabricated in a different layer. Silicon-on-insulator is the most evident material to work in, yet the proposed method does not rely specifically on this material system. The design process could also be used for other materials that are compatible with semiconductor fabrication processes such as, for example, lithium niobate, III/V-materials, silicon carbide or silicon nitride.

CONCLUSION

The OPAs of the present invention provide a large longitudinal steering range controlled by a change in wavelength. The OPA design is based on slow light waveguides in which we integrate antennas. All the design challenges in making this OPA were addressed using inverse design methods. The slow light waveguide was optimized to have a near-linear dispersion over a broad wavenumber range. To couple light to the slow light waveguide, we design an efficient mode converter that facilitates the coupling between a strip waveguide and the slow light waveguide in the operation bandwidth. To radiate light from the slow light waveguide, we designed compact antenna structures into the slow light waveguide. Combined, these components form an OPA which obtains performance not possible previously. In one implementation, the OPA can steer the optical beam 19° by scanning from 1543 nm to 1566 nm. Other embodiments may have even larger scanning range by pushing this OPA design further using the inverse design methods presented here. Relying on these design methods, the performance of compact integrated OPAs can now achieve and outperform current optical beam steering systems. This enables low-cost optical scanning functionality in a wide variety of applications.

The invention claimed is:

1. An optical phased array device comprising a photonic crystal having:
a dispersion engineered slow light waveguide region;
a mode coupler region capable of optically coupling an input waveguide to the dispersion engineered slow light waveguide region;
optical antenna regions being an integrated portion within the dispersion engineered slow light waveguide region;
wherein the dispersion engineered slow light waveguide region has a substantially linear dispersion relation within a predetermined operational bandwidth of the optical phased array device;
wherein the optical antenna regions are formed by an alteration of a periodic structure of the photonic crystal;
wherein the optical antenna regions have different radiation scattering strengths;
wherein the optical antenna regions are capable of radiating light out from the dispersion engineered slow light waveguide region.

2. The optical phased array device of claim 1 further comprising multiple photonic crystals stacked next to one another, wherein each of the photonic crystals is a photonic crystal according to claim 1.

3. The optical phased array device of claim 1 wherein the multiple photonic crystals are regions of a single monolithic photonic crystal.

4. The optical phased array device of claim 3 further comprising an optical splitter having multiple outputs and multiple phase modulators connected to the multiple outputs and to the multiple photonic crystals.

5. The optical phased array device of claim 1 further comprising an input waveguide region.

6. The optical phased array device of claim 1 wherein the dispersion engineered slow light waveguide region has an average group index substantially larger than 7 within a predetermined operational bandwidth.

7. The optical phased array device of claim 1 wherein the dispersion engineered slow light waveguide region has an average group index substantially equal to 25 within a predetermined operational bandwidth.

8. The optical phased array device of claim 1 wherein the dispersion engineered slow light waveguide region has a dispersion relation that deviates less than 10% from linear within a predetermined operational bandwidth of the optical phased array device.

9. The optical phased array device of claim 1 wherein the dispersion engineered slow light waveguide region has a dispersion relation that deviates less than 20% from linear within a predetermined operational bandwidth of the optical phased array device.

10. The optical phased array device of claim 1 further comprising a layer above the photonic crystal capable of facilitating radiation of light out from only one side of the dispersion engineered slow light waveguide region.

* * * * *